March 31, 1970 D. W. RICHARDSON ET AL 3,504,165

NAVIGATION STATION IDENTIFICATION

Filed March 27, 1967 5 Sheets-Sheet 1

INVENTORS.
DONALD W. RICHARDSON,
STANLEY N. ROSCOE,
ELLIOT P. HECTMAN,
BY
Robert Thompson
ATTORNEY.

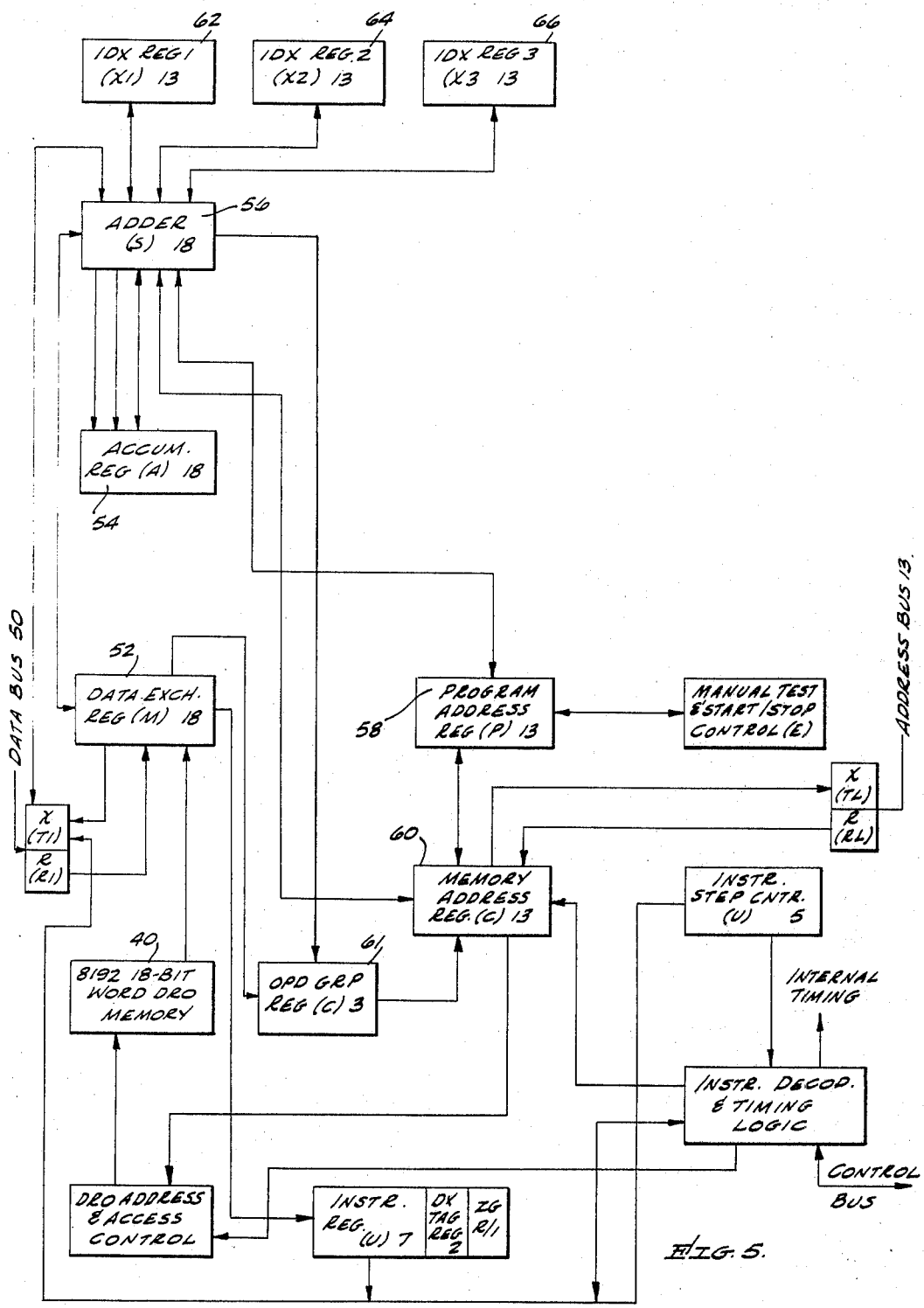

United States Patent Office 3,504,165
Patented Mar. 31, 1970

3,504,165
NAVIGATION STATION IDENTIFICATION
Donald W. Richardson, Woodland Hills, Stanley N. Roscoe, Los Angeles, and Elliot P. Hechtman, Santa Monica, Calif., assignors to Hughes Aircraft Company, Culver City, Calif., a corporation of Delaware
Filed Mar. 27, 1967, Ser. No. 626,324
Int. Cl. G06f 15/48
U.S. Cl. 235—150.23                            7 Claims

ABSTRACT OF THE DISCLOSURE

A navigation direction system in which dead reckoning aircraft position information is cyclically determined in response to aircraft flight sensor information wherein the dead reckoning information is up-dated every $n$ cycles with radio aid navigational information by a digital system that includes a memory for storing transmitter frequency, latitude, longitude, magnetic deviation and altitude information related to a plurality of radio aid stations comparator means for comparing the frequency of received radio aid signals with the stored radio frequencies for matching and identifying the received radio aid station and then comparing the latitude and longitude of the identified station with the aircraft's determined latitude and longitude and rejecting the stored information corresponding to the matched frequency information if the radio aid station is beyond the predetermined range or utilizing the stored information if the radio aid station is within a predetermined range.

---

This invention relates generally to improvements in navigation systems, and particularly to improvements in automatically identifying navigation information of a plurality of ground stations, or radio aid station.

One flight navigation technique employed today utilizes a system known as Air Traffic Control (ATC) which includes ground control vectoring of in-flight aircraft to permit efficient use of airways between origin and destination points. However, with the substantial increase in air traffic, an overcrowded condition of the airways has developed, which can be extremely dangerous as well as time-wasting and expensive. This condition is especially true at points of origin and destination and other terminal points.

This increase in air traffic has dictated an increase in the capacity of the ground control operation, thereby indicating that the ground control facilities may have to be expanded and increased. These ground control systems, however, do not provide continuous in-flight information on the aircraft location. In fact, navigation with these systems is attained by dead reckoning data from the aircraft sensors and by periodically vectoring the location of ground stations to attain a "fix" on the aircraft location. Of course, this means an added in-flight workload and a possibility of pilot error. In addition, there is a time delay between the time that the ground station information is received and used to correct the dead reckoning information. Consequently, in very crowded conditions, the ground controller has to actually transmit specific instructions to the aircraft.

It is therefore an object of this invention to provide a means that is an improvement in heretofore known navigation systems.

Another object is to provide an improved system that automatically identifies ground station information.

Another object is to provide in a system a means for identifying and verifying ground stations and for obtaining previously stored position information about the particular identified and verified ground station.

A still further object is to provide a navigation system operable over an area of ground stations in which some separated ground stations have the same frequency of transmission, to automatically determine which ground station is being interrogated at a selected frequency.

The above and other objectives can be attained in a system of the type in which navigation position information is determined from aircraft data such as true air speed, heading, and from radio aids such as ground stations.

The information is converted to a digital form and fed to a computer where dead reckoning latitude $\lambda_{dr}$ and longitude $\mu_{dr}$ are continually determined in a cyclic manner by a successive approximation technique relative to a last measured position.

After every $n$th dead reckoning cycle, the dead reckoning position information is corrected with measured latitude information $\lambda_{st}$ and longitude information $\mu_{st}$ relative to a known ground station such as a VORTAC station. The particular frequency $f_i$ of a ground station is converted to a digital form and compared with stored frequqency information $f_1$ through $f_n$, stored in a memory bank in a search operation to identify the particular station frequency. As a result, a particular memory location is identified, whereupon stored information on the identified ground station's latitude $\lambda_{st}$, longitude $\mu_{st}$, magnetic deviation $\delta_{st}$, and altitude $h_{st}$ can be read out of the memory bank by interrogating the particular memory locations that are logically related to the memory location of the related frequency information. In addition, after a station and its location is found, the station coordinates $\lambda_{st}$ and $\mu_{st}$ are examined for sufficient closeness to the smoothed aircraft position $\overline{\lambda}$ and $\overline{\mu}$. If the test passes the data for that station is stored as a check that the correct station was selected and that its data can be retrieved.

Other objects, features and advantages of this invention will become apparent upon reading the following detailed description of an embodiment and referring to the accompanying drawings, in which.

FIG. 5 is a diagram of a digital circuit that performs the operation of station identification and validity check;

Figure 1:
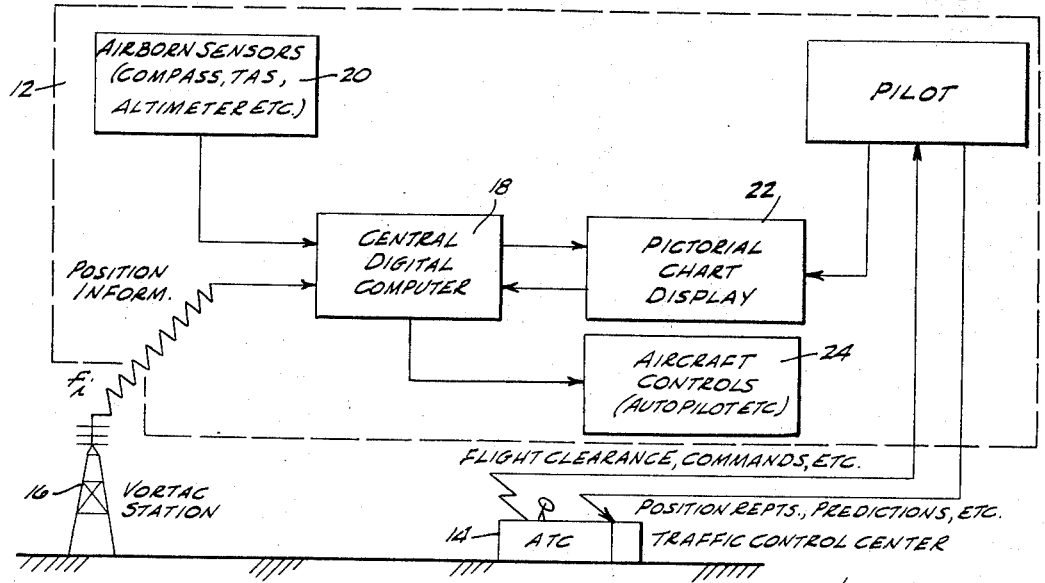
FIGURE 1 is a block diagram showing the relationship between an ATC (Air Traffic Control), a VORTAC ground station, and an aircraft.

Referring now to an embodiment, in FIG. 1 there is illustrated in block diagram form, an aircraft 12 that transmits signals such as position reports, predictions, etc., to an ATC (Air Traffic Control) center 14. In return, the ATC 14 and VORTAC station 16 transmit information to the aircraft 12. The transmitted ATC signals include flight clearances, commands, and other instructions. The VORTAC station transmits a signal having a frequency $f_i$ which is specifically related to that particular VORTAC station.

In addition to receiving the VORTAC frequency signal $f_i$, a central digital computer 18 in the aircraft 12 receives airborne sensor information such as compass heading, true air speed, altitude, etc., from an aircraft sensor means 20. The airborne sensor information is converted to a digital form and fed to the digital computer 18 where dead reckoning latitude $\lambda_{dr}$ and longitude $\mu_{dr}$ are continually determined in a cyclic manner by successive approximation technique relative to a last measured or smoothed position.

After every $n$th dead reckoning cycle, the dead reckoning position information is corrected or smoothed with measured latitude information $\lambda_{stn}$ and longitude information $\mu_{stn}$ relative to a known ground station such as VORTAC station 16 to obtain smoothed latitude $\bar{\lambda}$ and longitude $\bar{\mu}$ information.

Figures 2, 3:
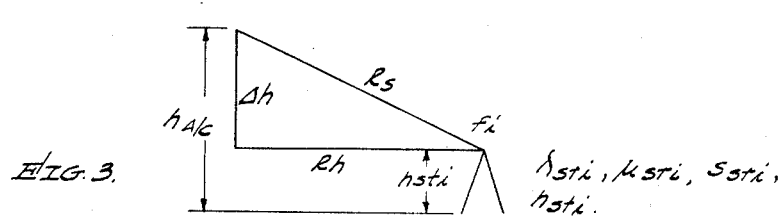
FIG. 2 is a block diagram showing the latitude and longitude relationship between an airplane and a plurality of ground stations (VORTAC)
FIG. 3 is a graphic schematic showing the altitude relationship of an airplane to a ground station.

As illustrated in FIG. 2, as the aircraft 12 travels along its flight path, it will be in contact with a plurality of ground stations, identified by the reference characters $f_1$, $f_2$, $f_3$, $f_4$, and $f_5$. Each of these stations has a specific location such as their latitude $\lambda_{st_1}$ and longitude $\mu_{st_1}$ for VORTAC $f_1$, and so on. Some of these transmitting stations are VORTAC stations $f_1$, $f_2$ and $f_3$ which are in range, one is a VORTAC station $f_5$ out of range, and one station, $f_4$, is an illegal transmitter. In addition, the aircraft 12 has a specific smoothed location of latitude $\bar{\lambda}$ and longitude $\bar{\mu}$, determined from previously received data.

In addition to the latitude, longitude, and magnetic deviation information $\delta_{sti}$, each station has altitude information, $h_{sti}$, as is best illustrated schematically in FIG. 3. From this information, the system determines slant range $R_s$ which is also fed to the computer 18 for making navigation calculations.

The calculated navigation information is fed to a pictorial chart display 22 where his position, relative to a display map, is always indicated. In addition, the navigation information can be fed to the aircraft controls and autopilot 24 to maintain the aircraft in the desired flight path.

Figure 4:
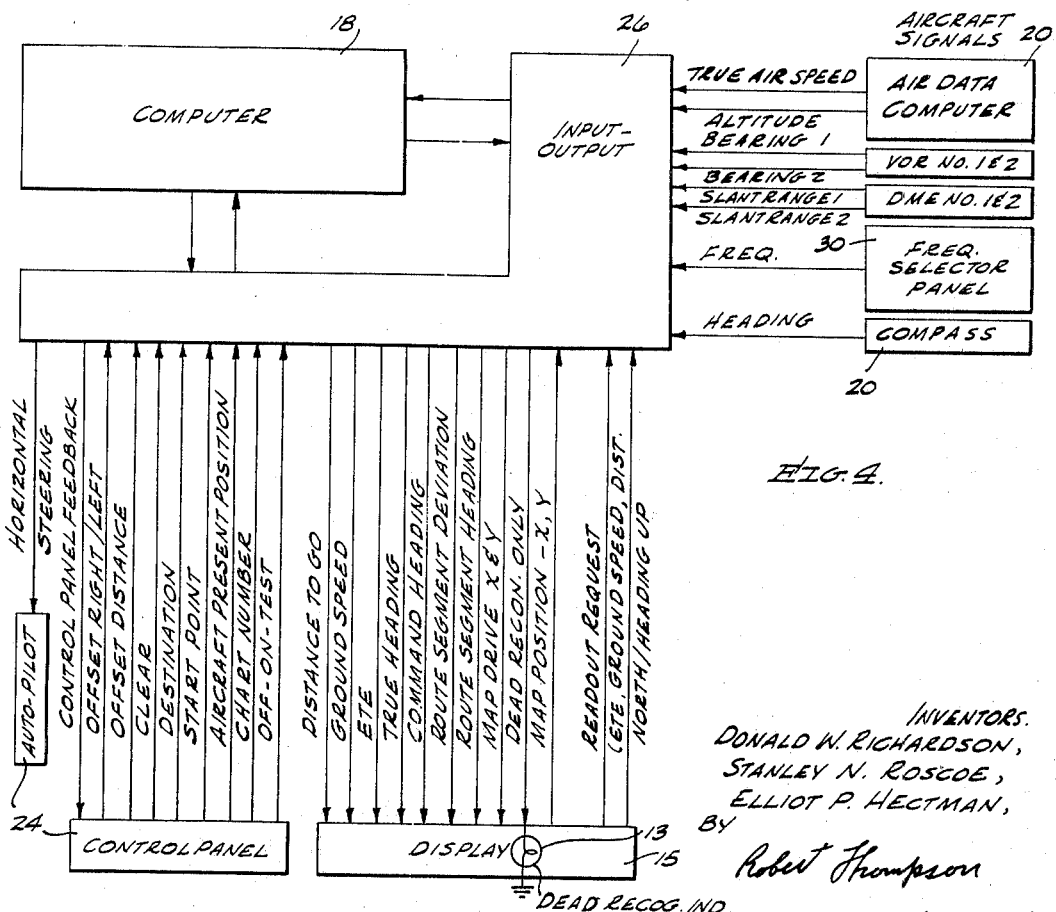
FIG. 4 is a block diagram of a navigation system that incorporates features of the invention.

Referring now to FIG. 4, the computer 18 and its relationship to the input/output unit 26, aircraft sensor means inputs 20 including an air data computer and a compass. VORTAC inputs and VORTAC frequency selector 30 are illustrated in block diagram form. Generally, the inputs from the aircraft sensors 20, the VORTAC bearing and slant range information and the frequency selector means 30 are converted to digital form before being fed to the computer 18.

In the computer 18, the navigation information is calculated from the dead reckoning information and the VORTAC information in the manner previously described. For example, the dead reckoning latitude $\lambda_{dr}$ and longitude $\mu_{dr}$ are continually calculated in a cyclic manner in which the information is updated by a new dead reckoning calculation at a rate of possibly 2 to 4 cycles per second. After every $n$th dead reckoning cycle, the dead reckoning positioning information is corrected to a smooth latitude information $\bar{\lambda}$ and longitude $\bar{\mu}$ from measured VORTAC information $\lambda_{sti}$ and $\mu_{sti}$.

Before the measured VORTAC information can be used, it must be identified and verified by the operation of the digital circuit illustrated in FIG. 5.

The information on a plurality of VORTAC stations which the airplane 12 could receive during a flight is prestored in the specific cells or locations of memory unit 40 in the computer. As illustrated schematically in FIG. 6, this stored information can include the frequency of the station $f_1$ through $f_n$, the respective latitudes $\lambda_{st1}$ through $\lambda_{stn}$, the respective longitudes $\mu_{st1}$ through $\mu_{stn}$, the respective magnetic deviations $\Delta_{st1}$ through $\Delta_{stn}$, and the respective altitudes $h_{st1}$ through $h_{stn}$.

In operation, the stored frequencies are searched and compared with the input or received frequency $f_i$ of an unknown VORTAC station. If no station for the frequency $f_i$ is found, an indicator 13 goes on, on the display panel, 15 (FIG. 4), and the aircraft goes on dead reckoning navigation computation. When, however, a comparison is found, the stored latitude and longitude data from the particular frequency $f_i$ is checked to see if the station is too far out of range; and if the search data latitude $\lambda_{sti}$ and longitude $\mu_{sti}$ are too far from the aircraft's smoothed latitude $\bar{\lambda}$ and longitude $\bar{\mu}$ position, the data is rejected, and an indicator goes on and the aircraft goes to dead reckoning computation.

RANDOM ACCESS MEMORY

The random access memory 40 schematically illustrated in FIG. 5 can be a conventional magnetic core coincident current memory unit of 4096 eighteen-bit words. The stored information is initially loaded from an external source and is assumed to be instantly accessible to the arithmetic and control portions of the computer.

Figures 6, 7:
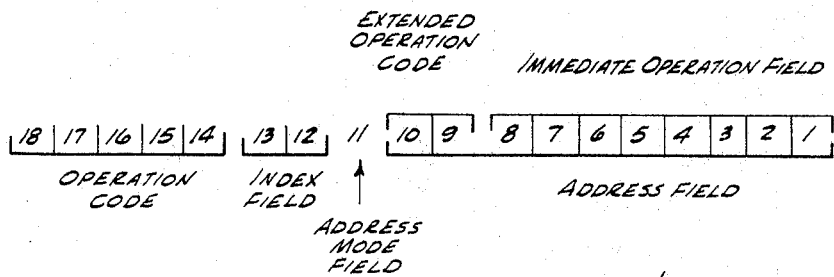
FIG. 6 is a table containing the initially stored information on a plurality of stations.
FIG. 7 is an instruction word format that may be utilized to explain the operation of the digital circuit of FIG. 5.

Overall, the format of the 18-bit instruction word is shown in FIG. 7. The 10 least significant bits (LSB) of the instruction form the immediate operand field and are used in determining the 10 least significant bits (LSB) of the effective address. They are the 10 LSB of the effective address unless indexing is specified, in which case the 10 LSB of the specified index register are added to the address field. The most significant bits of the effective address are dependent on the conditions specified in bits 11, 12 and 13.

Referring to the following instruction list of the following table, one arrangement for performing the station identification and range checking will be explained. The following table shows the memory octal address, the octal value at that address, the program mnemonic, the mnemonic address, and the nature of the operation.

| Address octal | Stored data octal | Program mnemonic | Mnemonic address | Nature of operation |
|---|---|---|---|---|
| 04007 | 720404 | DIA | 004 | Vortac table rout Input freq. |
| 04010 | 640017 | STO | F1 | |
| 04011 | 674032 | LXR | K2,3 | |
| 04012 | 056000 | LAR* | F1,3 | |
| 04013 | 100017 | SUB | F1 | |
| 04014 | 320044 | BNZ | VOR1 | |
| 04015 | 056001 | LAR* | LATS1,3 | Match found. |
| 04016 | 100002 | SUB | LATS | |
| 04017 | 640025 | STO | TSO | |
| 04020 | 056002 | LAR* | LNGS1,3 | |
| 04021 | 100003 | SUB | LNGS | |
| 04022 | 640026 | STO | TS1 | |
| 04023 | 670031 | LXR | K1,2 | Check closeness of sta to A/C. |
| 04024 | 170025 | LPM | TS0,2 | |
| 04025 | 100033 | SUB | K3 | – Is O.K. |
| 04026 | 340030 | BMI | $+2 | |
| 04027 | 300044 | BRU | VOR1 | Out of range. |
| 04030 | 550024 | BXD | $–4,2 | |
| 04031 | 056000 | LAR* | F1,3 | Store sta data. |
| 04032 | 640020 | STO | FST | |
| 04033 | 056001 | LAR* | LATS1,3 | |
| 04034 | 640021 | STO | LATST | |
| 04035 | 056002 | LAR* | LNGS1,3 | |
| 04036 | 640022 | STO | LNGST | |
| 04037 | 056003 | LAR* | DELS1,3 | |
| 04040 | 640023 | STO | DELST | |
| 04041 | 056004 | LAR* | KS1,3 | |
| 04042 | 640024 | STO | HST | |
| 04043 | 300001 | BRU | RET | |
| 04044 | 554046 | BXD | $+2,3 | |
| 04045 | 300001 | BRU | RET | Search done. |
| 04046 | 214027 | SXR | TS2,3 | Decrement XR3. |
| 04047 | 040027 | LAR | TS2 | |
| 04050 | 100034 | SUB | K4 | |
| 04051 | 715000 | PAX | 0,3 | |
| 04052 | 300012 | BRU | VOR+3 | |

In operation, the station information is stored in cells or word positions of the memory unit 40 for use in the navigation computation, as shown in FIG. 6. Then, as a VORTAC search operation is to be made, an index register is loaded with a program constant from a cell of the memory in four counts or clock periods, to start the search routine at the last stored frequency $f_n$ in the memory.

When a station $f_i$ is received, its characteristic frequency is fed to the computer 18 through the input/output unit 26 (FIG. 4) in the form of digital data over a two-way information bus 50 to execute a digital input to accumulator instruction (DIA) in five counts. The digital input to accumulator instruction transfers the 18 bits of data from the information bus 50 via a data exchange register 52 hereinafter also called an M register, to an accumulator register 54, hereinafter also called an A register. The effective address field of the instruction (FIG. 7) specifies to the input/output unit 26 which group of 18 bits or which stored word should be placed on the information bus 50 for transfer to the accumulator register 54.

For example, during the first two counts, the instruction is read from memory and decoded. During the next count, the information bus is gated into the M register 52, and during the next two counts, the contents of the M register 52 are transferred through an adder 56 to the accumulator register 54. In addition, the contents of a program register 58, hereinafter also referred to as a P register, are transferred to a memory address register 60, hereinafter also referred to as a C register, to read the next instruction.

Structurally, the digital circuits are conventional components and operate as follows:

The memory register 52 is an 18-bit parallel register implemented by cross-coupled NAND gates. It holds information coming from or going to the destructive readout (DRO) memory 40 and transfers information between the computer 26, the information bus 50, and external units or input/output unit 26.

The adder 56 performs in 18-bit ripple-carry parallel addition in one clock time. The adder also acts as a bus in the transfer of information among the various registers, and assists in shift, logical index, and program counter incrementation operations, but cannot be used as a data register itself since it consists only of gates.

The accumulator register 54 is an 18-bit register (one bit stores the sign) which is coupled to receive the output from the adder 56. During addition or subtraction, it holds one of the operands; and after the operation it contains the sum or difference.

The program address register 58 or P register is a 13-bit register used to hold the address of the next program instruction. The number in the P register is always incremented at the first count except during a branch instruction, as will be explained in more detail shortly.

The memory address register 60 or C register, which receives the information from the program register 58 is a 13-bit register. Its three most significant bits (FIG. 7) select the memory group of 1024 18-bit words, and its 10 least significant bits determine the memory location within the selected group. The C register 60 always holds the address of the current instruction during the first two counts and operand address during the next counts.

In addition, there is a group C register 61 which can consist of three flip-flops which hold the three most significant bits of the operand address, and can be considered an alternative to bits C11–C13 of the memory address register. The group register is not altered in the VORTAC search operation.

In operation, during the next computer instruction STO, the digitized frequency information $f_i$ on the received VORTAC station is stored in a specific location or cell of memory unit 40. For example, the contents of the accumulator 54 are stored at a specific location in memory 40 in four counts without modifying the contents of the accumulator.

The first two counts are used to read and decode the instruction. Then the contents of the accumulator 54 are transferred to the adder 56 and from there to the data exchange register 52, where they are written into the specified memory location. The contents of the accumulator are not modified. Then the contents of the P register 58 are transferred to the C register 60 to read the next instruction.

During the next instruction LXR, the address of the last stored VORTAC station $f_n$ is stored in one of the index registers 62, 64 and 66 to start the search at the last stored frequency $f_n$. More specifically, the 13 least significant bits of the specified memory location are transferred to a specified index register such as 66 without modifying the contents of the memory location. The desired index register 66 is selected with bits 13 and 12 (FIG. 7) being 01, 10, or 11 for index register 62, 64, or 66 respectively. This instruction requires four counts as follows:

During the first two counts, the instruction is read and decoded. Thereafter, the contents of the M register 52 are gated into the adder 56. Then the 13 least significant bits in the adder 56 are transferred into the specified index register 66.

Structurally, there are three identical 13-bit index registers in the system 62, 64 and 66. They are mainly used for address indexing operations to form the effective operand address. The index registers are directly accessible to the program by the load (LXR) and store (SXR) index register instructions.

After the selected index register has been loaded, the contents of P register 58 are transferred to the C register 60 to read the next instruction.

On the next instruction LAR, the specific contents of the memory $f_n$ are transferred to the accumulator register 54 during four counts or clock periods. For example, the contents of the specified location $f_n$ in memory 40 determined by the address contents of index register 66 are transferred to the accumulator 54 without modifying the contents of the memory location. During the first two counts, the instruction is read and decoded. Thereafter, the instruction gates the contents $f_n$ of the specified location of memory 40 from the M register 52 into the adder 56. More specifically, the 10 least significant bits of the M register 52 are gated into the 10 least significant stages of the adder 56. Then the adder contents are transferred into the accumulator 54. Thereafter, the contents of the program register or P register 58 are transferred to the C register 60 to read the next instruction.

Next, the received frequency $f_i$ is compared with the last stored frequency $f_n$. More specifically, on the next instruction SUB, the digitized frequency $f_i$ is subtracted from the contents of the accumulator register $f_n$. In other words, the contents of the specified memory location $f_i$ are subtracted from the contents of the accumulator $f_n$ with the difference $f_i-f_n$ appearing in the accumulator 54 without modifying the contents of the memory location. The subtract instruction requires four counts, as follows:

During the first two counts, the instruction is read and decoded. During the next count, the one's complement of the specified memory location is gated from the M register 52 into the adder 56 while the accumulator contents are fed into the other side of the adder. A carry zero is also gated into the adder. The sum is then transferred to the accumulator 54. If no overflow occurs, then the P register 58 is transferred to the C register 60 to read the next instruction.

If the accumulator contents are non-zero when the branch on non-zero instruction BNZ is given, a search of the next stored frequency $f_{n-1}$ is started for comparing it with the stored PORTAC frequency information $f_i$ as will be explained in more detail shortly.

If, however, the content $f_i-f_n$ of the accumulator 54 is zero, then a match is found and the next instruction in order is executed. Assuming that a match is found, the program counter is incremented in the normal manner and the next instruction is executed. The BNZ instruction requires four counts. During the first two counts, the instruction is read and decoded. Next, the contents of the M register 52 are gated into the adder 56 while the one's complement of the M register 52 are gated into the adder 56. The sum will thus be all ones and when the contents of the accumulator 54 are added, will be high if any of the 18 bits of the sum are zeros. That is, if the contents of the accumulator are not all zeros, the sum with all ones will give a result with one or more zeros. If not, the accumulator is zero, no branching occurs and the next instruction is executed in the normal manner. On the last count, if the branching conditions checked during the previous count are zero the P register contents are gated into the C register 60.

On the next instruction LAR, if there is a match, the accumulator register 54 is loaded with the stored latitude information $\lambda_{stn}$ on the matched frequency $f_{stn}$ VORTAC station as determined by the address of the index register 66. Since the load accumulator operation has been previously described, it is sufficient to say that the contents $\lambda_{stn}$ of the specified location in memory 40 are transferred to the accumulator 54, without modifying the contents of the memory location, through the M register 52 and adder 56. Thereafter, the contents of the P register 58 are transferred to the C register to read the next instruction.

On the next instruction SUB, smoothed latitude $\bar{\lambda}$ of the aircraft 12 which is continually being updated and stored in a specified cell of the memory 40 is subtracted from the latitude $\lambda_{stn}$ stored in the accumulator 54. As previously explained in the preceding subtraction instructions, the contents of the specified memory location as transferred from the M register 52 and fed to added 56 where it is subtracted from the contents $\lambda_{stn}$ of the accumulator 54 with the difference $\lambda_{stn}-\bar{\lambda}_n$ appearing in the accumulator 54. The contents of the memory location are not modified. The overflow indicator flip-flop is set if an overflow occurs. Thereafter, the content of the P register is transferred to the C register 60 to initiate the next instruction.

The contents $\lambda_{stn}-\bar{\lambda}$ of the accumulator 54 are then temporarily stored on a cell of the memory 40 on the next instruction STO. As explained in the previous store accumulator instruction, the contents of the accumulator 54 are stored in a specified temporary memory location TSO without modifying the contents of the accumulator information. More specifically, the accumulator content is transferred through the adder 56 to the M register 52 and to the specific memory locations TSO. Thereafter, the content of the P register 58 is transferred to the C register 60 to initiate the next instruction.

During the next instruction LAR* the accumulator 54 is loaded with the station longitude information $\mu_{stn}$ from a specified location in memory 40. As in the previously described load accumulator instruction the contents of the specified memory location in memory 40 are transferred through the M register 52 and adder 56, to the accumulator 54 without modifying the contents of the memory location. Then the content of the P register 58 is transferred to the C register 60 to initiate the next instruction.

In the operation on the next instruction SUB, the station longitude $\mu_{stn}$ is subtracted from the smoothed longitude $\bar{\mu}$ that is continually stored on a specified memory cell and the difference $\mu_{stn}-\bar{\mu}$ is stored in the accumulator. During subtraction operation, the contents of the specified memory location $\bar{\mu}$, as determined by the instruction address, are fed through the M register 52 to the adder 56 where they are subtracted from the contents $\mu_{stn}$ of the accumulator 54 with the difference appearing in the accumulator 54. The contents of the memory location are not modified. The overflow indicator flip-flop is set if an overflow occurs. Thereafter, the content of the P register is transferred to the C register to initiate the next instruction.

During the operation of the next instruction STO, the accumulator content $\mu_{stn}-\bar{\mu}$ is temporarily stored in a specified cell of memory 40. During the store accumulator instructions the contents of the accumulator 54 are transferred through the adder 56 and M register 52 and are stored in the specified temporary memory location TSI without modifying the contents of the accumulator. Then the content of the P register 58 is transferred to the C register 60 to initiate the next instruction.

At this time, the closeness of the station to smoothed aircraft location is checked to see if the station information is acceptable, or in other words, to see if the station is within a specified range or is out of range.

For a closeness check in the next instruction LXR, the index register 64 is loaded with the address of a constant $K_1$, equal to 0001. More specifically, as explained in the operation of the previous for load index register instruction, the 13 least significant bits of specified memory location $K_1$ are transferred to the specified index register through the M register 52 and the adder 56 without modifying the contents of the memory location. The desired index register is selected with bits 13 and 12 (FIG. 7) being 10, for index register 64. Thereafter, the contents of the P register 58 are transferred to the C register 60 to initiate the next instruction.

During the operation on the next instruction LPM, the positive magnitude of the contents $\lambda_{stn}-\bar{\lambda}$ of the specified temporary storage memory location TSO is transferred to the accumulator 54. That is, if the memory word is positive, it is loaded into the accumulator 54 and if the memory word is negative, its two's complement is loaded into the accumulator 54. The contents of the memory location are not modified. This load positive magnitude instruction requires four counts of execution.

For example, during the first two counts, the instruction is read and decoded. Then if the contents of the specified memory location TSO are positive, they are gated into the adder 56. If the contents of the specific memory location TSO are negative, then the "one's" complement of the contents are gated into one side of the adder. Also, there is a carry into the least significant bit to form the "two's" complement and thus the magnitude of the specified memory content. Whether the memory location had been positive or negative, the magnitude is now in the adder 56 and is gated into the accumulator 54. Thereafter the P register content is transferred to the C register 60 to read the next instruction.

Then on the next instruction SUB, the contents $K_3$ of a specified memory location are subtracted from the accumulator contents to see if the station distance from the aircraft location is too far or if it is sufficiently close to provide good navigation information. The contents $K_3$ of a specified memory location are fed through the M register 52 to the adder 56 where they are subtracted from the contents of the accumulator $\lambda_{stn}-\bar{\lambda}$ with the difference $(\lambda_{stn}-\lambda)-K_3$ appearing in the accumulator 54. The contents of the memory location are not modified. The overflow indicator flip-flop is set if an overflow occurs.

If the station $f_{stn}$ is too far away, $(\lambda_{stn}-\bar{\lambda})-K_3$ is a plus number and a branch instruction is given to search the next stored station frequency $f_{n-1}$ which will be explained in more detail shortly. If, however, the station is sufficiently close to the aircraft, a negative number is in the accumulator 54 and the contents of the P register 58 are transferred to the C register 60 to read the next instruction.

For example, in the next instruction BMI, a branch on minus operation takes place. More specifically, if the contents of accumulator 54 are negative, the program counter is set to the effective address of the BMI instruction for checking the closeness of the longitude of the received station $\mu_{stn}$ and the smoothed longitude $\bar{\mu}$. If, however, the sign is positive, the next instruction in sequence is read. During the first two counts, the instruction is read and decoded. During the next count, if the sign of the accumulator is negative, the program counter is set to the address of the BMI instruction on minus. If the branch conditions T2 are not met, then the P register contents are transferred to the C register 60 to read the next instruction.

Thus, if the latitude closeness is O.K., then the next instruction BRU is skipped and a branch with index decremented instruction BXD is given so that the computer can check the closeness of the station longitude by the longitude information $\mu_{stn}-\bar{\mu}$ stored in the temporary memory location TS1. Thereafter the load positive magnitude LPM, subtraction SUB of $\mu_{stn}-\bar{\mu}$ from $K_3$, and branch on minus BMI steps are repeated for checking the longitude closeness in the same manner as explained above for checking the closeness of the latitude information. If the stored station longitude information $\mu_{stn}$ is sufficiently close to the smooted aircraft longitude $\bar{\mu}$, then the received information on the VORTAC station will be used in making the navigation computation.

More specifically, in the search for longitude closeness, if the branch with index decremented instruction BXD is given, then the index register 64 is decremented by 4 to retrieve the longitude information $\mu_{stn}-\bar{\mu}$ in temporary storage TS1. In other words, the index register 64, specified in bits 12 and 13 of the instruction, is decremented by four, and unless the 10 least significant bits of the index register were all zeros before being decremented, control is transferred to the effective address of the BXD instruction. If the 10 least significant bits of the specified index register were all zeros, the next instruction in sequence is executed.

If, however, the station's latitude $\lambda_{stn}$ or longitude $\mu_{stn}$ are not sufficiently close to the aircraft's respective smoothed positions $\lambda$, $\bar{\mu}$, it is out of range, and the next instruction after BMI would not be skipped and the branch unconditional instruction BRU would be given to search the next stored station frequency $f_{n-1}$. This sequence will be repeated until a frequency match is found or whereupon the new station must be located.

For example, if the station is too far out of range, the next instruction is a branch unconditional instruction BRU. In other words, the Program Address Register 58 is set to the effective address of the instruction for searching the stored frequencies with the index register 66 decremented by 5. If bit 11 specifies indirect addressing, the effective address is determined by appending the Operand Group Register to the address field (FIG. 7) of the branch with index decremented instruction BXD. The BRU instruction requires four counts for execution, whereupon the effective address of the BXD instruction address field with the index register count decremented by 5 is now in both the C and P registers, for reading and the next instruction.

If the station $f_n$ is sufficiently close, on the next instruction LAR* the contents of the memory location $f_n$, determined by address of $f_1$ + the index register 66, is loaded into the accumulator 54. For example, the contents of the specified location in memory $f_n$ are transferred through the M register 52 and adder 56 to the accumulator 54 without modifying the contents of the memory location. Thereafter, the contents of the P register 58 are transferred to the C regiser 60 to read the next instruction.

In the next instruction STO, the accumulator contents $f_n$ are stored in a specified memory location for subsequent use in navigation computation. More specifically, the contents of the accumulator 54 are fed through the adder 56 and M register 52 and are stored in the specified memory location in four counts without modifying the contents of the accumulator. Thereafter, the contents of the P register 58 are transferred to the C register 60 to read the next instruction.

On the next instruction LAR*, the latitude $\lambda_{stn}$ stored in a location of memory 40 at an address determined by the address of the stored latitude $\lambda_{st1}$ for station + the count in the index register 66 is loaded in the accumulator 54. For example, the contents $\lambda_{stn}$ of the specified location in memory 40 are transferred through the M register 52 and adder 56 and to the accumulator 54 without modifying the contents of the memory location. The load accumulator execution requires four counts. Thereafter, the contents of the P register 58 are transferred to the C register 60 to read the next instruction.

In the operation of the next instruction STO, the contents $\lambda_{stn}$ of the accumulator 54 are stored in a specified memory location for subsequent use in navigational computation. More specifically, the contents of the accumulator 54 are fed through the adder 56 and M register 52 and are stored in the specified memory location without modifying the contents of the accumulator 54. Then the contents of the P register 58 are transferred to the C register 60 to read the next instruction.

In the operation of the next instruction LAR*, the longitude $\mu_{stn}$, as determined by the address of longitude $\mu_{st1}$ for plus the count in the index register 66 is transferred from the memory 40 to the accumulator 54. More specifically, the contents $\mu_{stn}$ of the specified location in memory 40 are transferred through the M register 52 and adder 56 and are transferred to the accumulator 56 without modifying the contents of the memory location. Thus, the contents of P register 58 are transferred to the C register 60 to read the next instruction.

In the operation of the next instruction STO, the longitude $\mu_{stn}$ is transferred from the accumulator 54 to a specified memory location for subsequent use in the navigation computation. For example, the contents of $\mu_{stn}$ of the accumulator 54 are transferred through the adder 56 and the M register 52 and are stored in the specified memory location without modifying the contents of the accumulator. Then the contents of the P register 58 are transferred to the C register 56 to read the next instruction.

Then the magnetic deviation information $\Delta_{stn}$, determined by the address of the magnetic deviation $\Delta_{st1}$ for station $f_1$ + the count in the index register are stored in a specified memory location for subsequent use in the navigation computation in a two-instructions LAR*, and STO as were the latitude $\lambda_{stn}$ and longitude $\mu_{stn}$, and consequently are not again explained in detail.

The altitude information $h_{stn}$ for the received station $f_n$ is also stored in a specified memory location for subsequent use in the navigation computation in the same two-instruction manner (LAR* and STO) as the latitude and longitude information and consequently is not explained in detail.

After all of the stored information on a particular valid VORTAC station having a frequency $f_n$ are stored in the specified memory locations for use in navigation computation. A branch unconditional instruction BRU is given which returns the computer operation to the beginning of the search operation. For example, the Program Address Register 58 is set to the effective address of the beginning search instructions.

As previously stated, if there is no stored frequency $f_n$ for the received station frequency $f_1$ or if the stored $\lambda_{stn}$ information is not sufficiently close to the smoothed latitude $\bar{\lambda}$ of the aircraft or if the stored longitude $\mu_{stn}$ is not sufficiently close to the smoothed longitude $\bar{\mu}$ of the aircraft, then the next stored frequency information $f_{n-1}$ which is located at an address determined by the address of $f_1$ + the decrement index register 66 is searched and compared in the above manner.

This operation is accomplished with a branch with index decremented BXD instruction. More specifically, the index register 66 specified in bits 12 and 13 of the instruction is decremented by one and, unless the 10 least significant bits of the index register were all zeros before being decremented, control is transferred to the effective address of the BXD instruction. If, however, the 10 least significant bits of the specified index register were all zeros, all the stored frequencies $f_n$ through $f_1$ have been searched, and the next instruction in sequence is executed, whereupon the navigation system goes on dead reckoning navigation only, and the pilot is given an indication that the aircraft is on dead reckoning, only. With this indication, the pilot will then search for a new VORTAC station with a different frequency.

In order to decrement the index register 66, the sequential operation instructions are given where the P register 58 transfers its contents to the C register 60.

To decrement the index register 66 on the first instruction SXR, the contents of the specified index register 66 are transferred through the adder 56, and the M register 52 and are stored in the 13 least significant bits of the specified temporary memory location TS2. Bits 14 through 18 of that location are cleared to zero. Bits 13 and 12 of the SXR instruction are used to determine which index register is to be stored in memory. As previously stated, 01, 10 and 11 are used to specify 62, 64 and 66, respectively. The content of the program register 58 is transferred to the memory address register 60 to read the next instruction.

In the operation on the next instruction LAR, the contents of the temporary storage TS2 memory location are loaded into the accumulator 54. More specifically, the contents of the specified temporary storage location TS2 in memory 40 are transferred through the M register 52 and adder 56 to the accumulator 54 without modifying the contents of the memory location. Then the contents of the P register 58 are transferred to the C register 60 to reach the next instruction.

In the operation of the next instruction SUB, the contents of the accumulator 54 are substracted from a specified memory location which contains a constant $K_2$ equal to the decrementing count of 0004. More specifically, the contents $K_4$ of the specified memory location are transferred through the M register 52 to the adder 56 where they are subtracted from the contents of the accumulator 54 with the difference appearing in the accumulator 54. The contents of the memory location are not modified. Then the contents of the P register 58 are transferred to the C register 60 to read the next instruction.

In the operation of the next instruction PAX, the decremented contents of the accumulator 54 are placed in the index register 66. For example, the 13 least significant bits of the accumulator are transferred through the adder 56 to the specified index register 66 without modifying the contents of the accumulator 54. The index register is selected from bits 12 and 13. Then the contents of the P register 58 are transferred to the C register 60 to read the next instruction.

In the next operation, a branch unconditional instruction BRU is given to start the table search routine for the next VORTAC station $VOR_{n-1}$. In other words, the Program Address Register 58 is set to the effective address of the instruction which is $f_1$ + the decremental count in index register 66. Thereafter, the same search is initiated until a frequency match is found.

Figure 8:
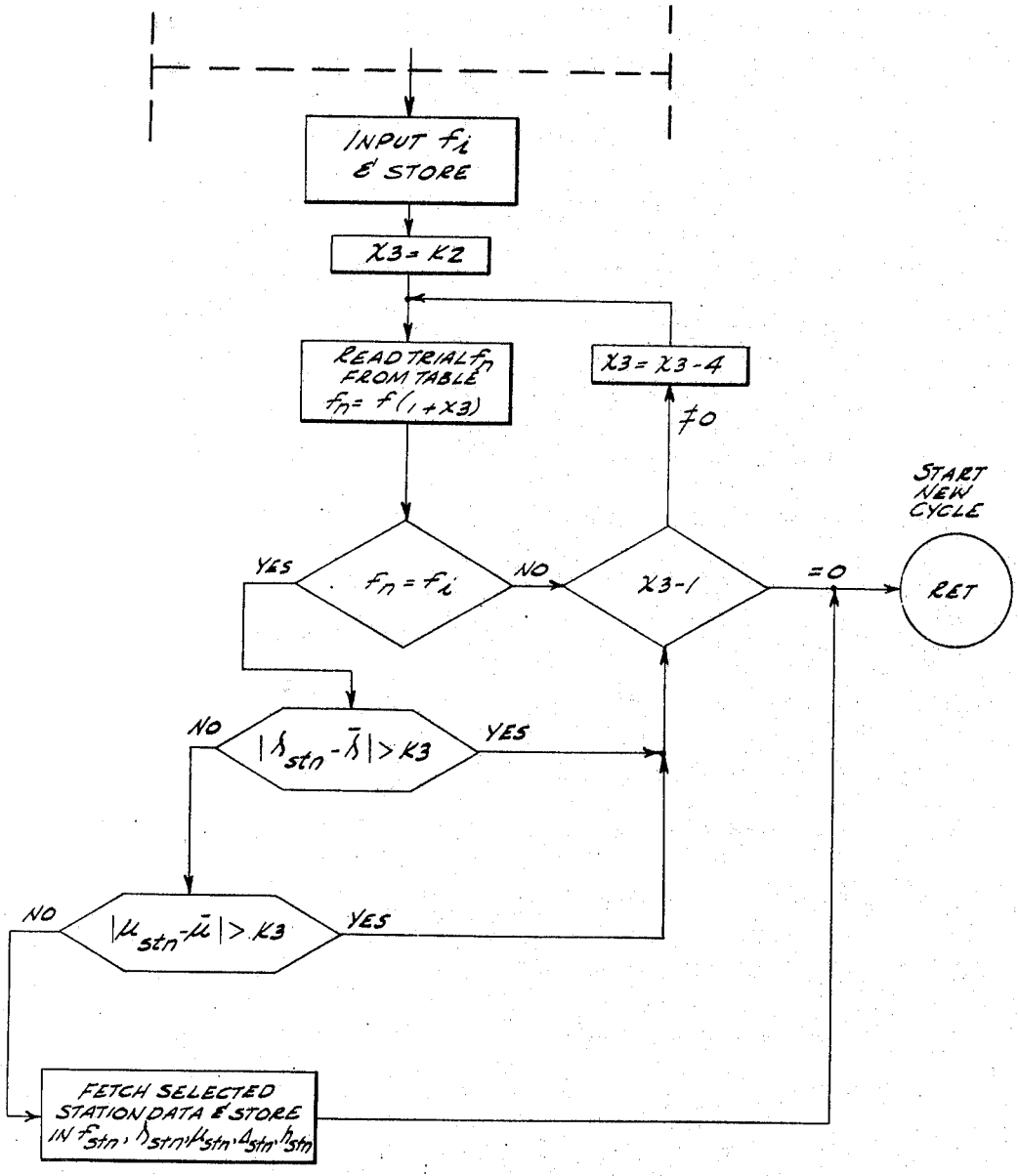
FIG. 8 is a flow diagram for explaining the navigation system station determination and validity check in accordance with the principles of the invention.

In summary, the digital computer circuit of 5 operates in the manner illustrated in the functional block diagram of FIG. 8. For example, the incoming frequency signal $f_1$ is sequentially compared with the stored frequency data on a plurality of radio ground stations, starting with the last stored frequency first. If no match is found, the index register XR3 is decremented to compare the next stored frequency $f_{n-1}$ with the incoming frequency $f_i$. When all of the stored frequency $f_n - f_1$ have been searched, the index register 66 is at zero and a branch instruction RET returns the search to the beginning. At the same time, the navigation system goes on to dead reckoning and an indicator goes on.

If a match of frequency $f_n$ with $f_i$ is found, then the stored latitude information $\lambda_{stn}$ for that station is compared with an automatically determined smoothed latitude information $\bar{\lambda}$ of the aircraft by substraction and comparison with a constant $K_3$ to see if it is beyond a predetermined range. If it is beyond a certain range, the difference of the latitude $\lambda_{stn}-\bar{\lambda}$ exceeds the constant $K_3$ and a branch instruction is given to decrement the index register XR3 and search the next frequency $f_{n-1}$. If the station latitude $\lambda_{stn}$ is not beyond the predetermined range, then a branch instruction is given to check if the station longitude $\mu_{stn}$ is beyond a frequency range by comparing the difference data $\mu_{stn}-\bar{\mu}$ with the constant $K_3$. If the station longitude $\lambda_{stn}$ is beyond the predetermined range, the constant $K_3$ is exceeded and a branch instruction is given to decrement the index register XR3 and search the next stored frequency $f_{n-1}$. If, however, the station longitude $\mu_{stn}$ is not beyond a predetermined range, then the stored latitude $\lambda_{stn}$, longitude $\mu_{stn}$, magnetic deviation $\Delta_{stn}$ and altitude $h_{stn}$ are stored in specific cells of the memory 40 for continual use in the navigation computation for smoothed position.

While the salient features have been illustrated and described with respect to a particular embodiment, it should be readily apparent that modifications can be made within the spirit and scope of the invention, and it is therefore not desired to limit the invention to the exact details shown and described.

What is claimed is:

1. In a navigation system for determining navigation position information, an improvement in identifying radio aid stations, comprising:
   storage means for storing navigation information about a plurality of radio aid stations;
   receiver means for receiving a transmitted signal from one of the radio aid stations;
   compare means coupled to sequentially compare the receiver means for receiving rigitized frequency information about the plurality of radio aid stations until a match is found; and
   means responsive to said compare means when a match is found for comparing other stored navigation information related to the matched radio aid station with the determined navigation position for rejecting the compared navigation information if the radio aid station is beyond a predetermined range, and for utilizing the radio aid station navigation information if the compared station is within a predetermined range.

2. In a navigation system for continually determining navigation position information, an improvement in identifying radio aid stations, comprising:
   storage means including a digital circuit for storing digitized frequency information about a plurality of radio aid stations;
   receiver means for receiving digitized frequency information from one of the radio aid stations; and
   compare means coupled for sequentially comparing the received frequency information with corresponding stored frequency information about the plurality of radio aid stations until a match is found.

3. In the system of claim 2 in which said storage means is operable to store position information about a plurality of radio aid stations; and further including means coupled to be responsive when a frequency match is found by said compare means for comparing the stored position information related to the matched radio aid station with the determined navigation position for rejecting the compared information if the radio aid station stored position information is beyond a predetermined range, and for utilizing the radio aid station position information if the compared radio aid station is withn a predetermined range.

4. In the navigation system of claim 3, in which said storage means is operable to store latitude and longitude information about a plurality of radio aid stations; and the last said means coupled to be responsive when a match is found, operably compares stored latitude information related to the matched radio aid station with the determined navigation latitude position for rejecting the compared information if the radio aid station is beyond a predetermined range, and for then comparing stored longitude information related to the matched radio aid station with the determined longitude position for rejecting the compared information if the longitude information of the station is beyond a predetermined range, and for utilizing the radio aid station information if the compared station is within a predetermined range.

5. In the navigation system of claim 3 said storage means is operable to store digital frequency, latitude, and longitude information about a plurality of radio aid stations; and the last said means coupled to be responsive to said compare means when a match is found for comparing other stored latitude information and stored longitude information related to the matched radio aid station with the continually determined navigation latitude information and longitude information respectively, for rejecting the compared ground station information if the radio aid station latitude or longitude is beyond a predetermined range, and for utilizing the radio aid position information if the compared station is within a predetermined range; and means responsive to the last said means and coupled to said compare means for restarting the comparison sequence at the next stored frequency information if the information is rejected.

6. In a navigation circuit of the type which continually determines the navigation position of a vehicle, an improvement therein comprising:

digital memory means for storing digital frequency information about a plurality of radio aid stations initially stored at a plurality of individual locations therein;

input means for receiving digitized frequency information corresponding to signals received from a radio aid station;

retrieval means coupled to retrieve stored information from said digital memory means, said means being operable to sequentially retrieve the stored digital frequency information;

comparison means coupled to said retrieval means for comparing the retrieved information with another digital information signal, said means being operable to compare the received digitized frequency information and the sequentially retrieved stored frequency information signal for generating a signal when a match occurs; and indicator means responsive to the said comparison means for indicating when all of the stored radio aid frequency information has been retrieved and compared.

7. The system of claim 6 in which said digital memory means is further operable to store digital information on the latitude, longitude, magnetic deviation, and altitude corresponding to each of the plurality of radio aid stations stored at a plurality of locations therein; said retrieval means being further responsive to said comparison means for determining the latitude range by retrieving the latitude information corresponding to the matched frequency radio aid station from said digital memory means for checking the latitude position with the continually determined latitude position for determining latitude range, said comparison means being further operable and coupled to said retrieval means for restarting the sequential retrieval of stored frequency information at the next stored frequency if the latitude range exceeds a predetermined amount; and said retrieval means being further responsive to said comparison means for determining the longitude range by retrieving the longitude information corresponding to the matched frequency radio aid station from said digital memory means for checking the longitude position with the continually determined longitude position for determining longitude range where the latitude range is less than a predetermined amount, and said comparison means being further operable and coupled to said retrieval means for restarting the sequential retrieval of stored frequency information at the next stored frequency if the longitude range exceeds a predetermined amount.

References Cited

UNITED STATES PATENTS

| | | | |
|---|---|---|---|
| 3,103,579 | 9/1963 | Green | 235—150.27 |
| 3,242,494 | 3/1966 | Gicca | 343—112 |
| 3,308,278 | 3/1967 | Davis et al. | 235—150.27 |
| 3,328,795 | 6/1967 | Hallmark | 343—7 |
| 3,364,343 | 1/1968 | Hunt | 235—150.27 |
| 3,388,397 | 6/1968 | Thornhill et al. | 343—105 |
| 3,397,400 | 8/1968 | Maass et al. | 343—112 |
| 3,400,399 | 9/1968 | Kline | 343—112 |

EUGENE G. BOTZ, Primary Examiner

R. W. WEIG, Assistant Examiner

U.S. Cl. X.R.

235—150.27; 343—5, 112

PO-1050
(5/69)

UNITED STATES PATENT OFFICE
CERTIFICATE OF CORRECTION

Patent No. 3,504,165          Dated March 31, 1970

Inventor(s) Donald W. Richardson, Stanley N. Roscoe, and Elliot P. Hechtman

It is certified that error appears in the above-identified patent and that said Letters Patent are hereby corrected as shown below:

Col. 2, line 22, "frequqency" should be --frequency--;
        line 40, "." should be --:--;
        line 47, "graphic" should be --graphical--.
Col. 3, line 19, delete "their";
        line 25, "$\lambda$" should be --$\overline{\lambda}$--.
Col. 4, in the Table, "KS1,3" (the Mnemonic address for Address octal 04041) should be --HS1,3--.
Col. 5, line 31, "in" should be --an--.
Col. 6, line 66, "PORTAC" should be --VORTAC--.
Col. 8, line 33, "of" should be --for--;
        line 58, "$(\lambda_{stn}-\lambda)$" should be --$(\lambda_{stn}-\overline{\lambda})$--.
Col. 9, line 37, "$\lambda$" should be --$\overline{\lambda}$--;
        line 65, "regiser" should be --register--.
Col. 11, line 58, "decremental" should be --decremented--.
Col. 12, line 2, "substraction" should be --subtraction--;
        line 37, "receiver means for receiving rigitized frequency" should be --received information with corresponding stored--.
        line 71, "withn" should be --within--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,504,165      Dated March 31, 1970

Inventor(s) Donald W. Richardson, Stanley N. Roscoe, and Elliot P. Hechtma:

It is certified that error appears in the above-identified patent and that said Letters Patent are hereby corrected as shown below:

Col. 2, line 22, "frequqency" should be --frequency--;
        line 40, "." should be --:--;
        line 47, "graphic" should be --graphical--.
Col. 3, line 19, delete "their";
        line 25, "$\lambda$" should be --$\bar{\lambda}$--.
Col. 4, in the Table, "KS1,3" (the Mnemonic address for Address octal 04041) should be --HS1,3--.
Col. 5, line 31, "in" should be --an--.
Col. 6, line 66, "PORTAC" should be --VORTAC--.
Col. 8, line 33, "of" should be --for--;
        line 58, "$(\lambda_{stn}-\lambda)$" should be --$(\lambda_{stn}-\bar{\lambda})$--.
Col. 9, line 37, "$\lambda$" should be --$\bar{\lambda}$--;
        line 65, "regiser" should be --register--.
Col. 11, line 58, "decremental" should be --decremented--.
Col. 12, line 2, "substraction" should be --subtraction--;
        line 37, "receiver means for receiving rigitized frequency" should be --received information with corresponding stored--.
        line 71, "withn" should be --within--.

SIGNED AND SEALED
AUG 18 1970

(SEAL)
Attest:

Edward M. Fletcher, Jr.
Attesting Officer

WILLIAM E. SCHUYLER, JR.
Commissioner of Patents